(12) United States Patent
Hida et al.

(10) Patent No.: US 6,288,770 B1
(45) Date of Patent: Sep. 11, 2001

(54) APPARATUS AND METHOD FOR FEEDING A FILM

(75) Inventors: Keiji Hida, Hannan; Yukimasa Naka; Yoshihiro Koyama, both of Wakayama, all of (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 09/281,960

(22) Filed: Mar. 31, 1999

(30) Foreign Application Priority Data

Apr. 17, 1998 (JP) .................................................. 10-124225

(51) Int. Cl.[7] ............................ G03B 27/52; G03B 17/24
(52) U.S. Cl. .............................. 355/40; 396/311; 396/319
(58) Field of Search ............................... 396/311, 319, 396/429; 355/40, 42; 348/96

(56) References Cited

U.S. PATENT DOCUMENTS 5,727,240 * 3/1998 Mizumoto et al. .................. 396/319
5,847,811 * 12/1998 Tsujimoto et al. ...................... 355/40
6,026,249 * 2/2000 Sasaki et al. ......................... 396/319
6,055,382 * 4/2000 Mizumoto et al. .................. 396/319

* cited by examiner

Primary Examiner—Alan A. Mathews
(74) Attorney, Agent, or Firm—Smith Patent Office

(57) ABSTRACT

A film feeding apparatus and method are disclosed that have improved operability and reliability using magnetic reading devices and read magnetic data frame by frame, store them in RAM and set flags indicative of the presence or absence of the magnetic data while a film is unwound. If a frame whose magnetic data has not been read yet is judged to be present with reference to the flags in RAM, the magnetic data are read and stored in RAM and the flags are set while the film is rewound. If the frame whose magnetic data has not been read yet is judged again to be present with reference to the flags in RAM even after the film is rewound, an operator is notified by means of a display. If the operator gives a command to reread the magnetic data by means of a keyboard, the magnetic data are reread again after the feeding speed of the film is changed.

11 Claims, 13 Drawing Sheets

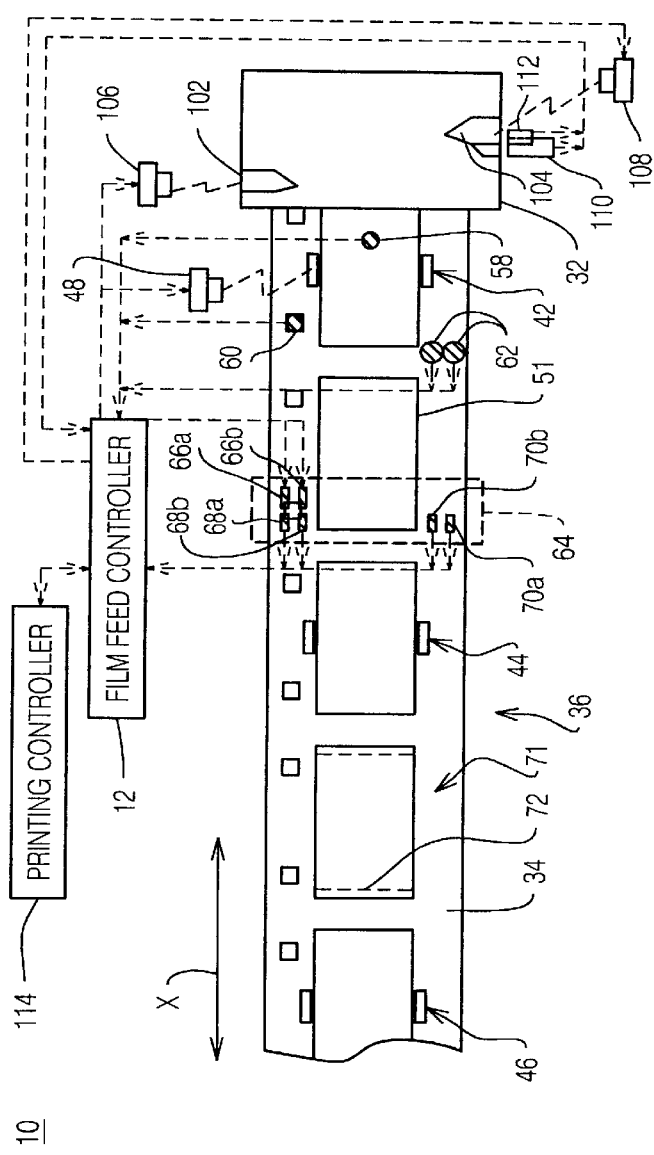
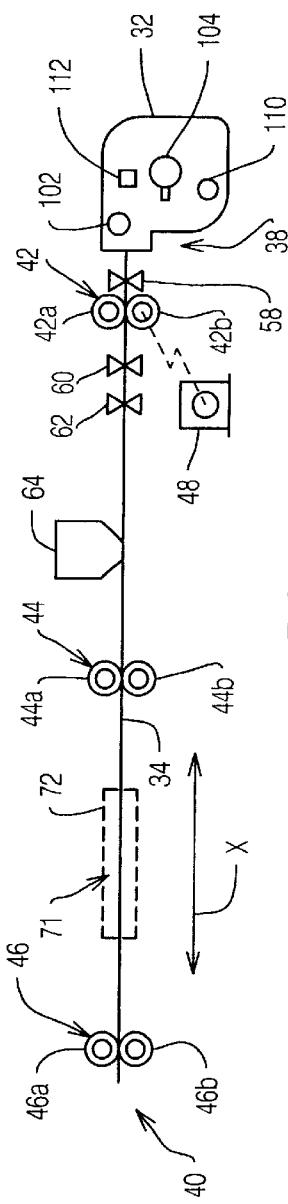

MAGNETIC DATA RECORDING POSITIONS

BAR CODE RECORDING POSITIONS

FIG. 5

| OUTPUT OF DRIVER | DATA PULSE FROM PEAK DETECTOR | DATA PULSE OUTPUTTED |
|---|---|---|
| F-ROTATION ( 0 ) | HIGH ( 1 ) | HIGH ( 1 ) |
| F-ROTATION ( 0 ) | LOW ( 0 ) | LOW ( 0 ) |
| R-ROTATION ( 1 ) | HIGH ( 1 ) | LOW ( 0 ) |
| R-ROTATION ( 1 ) | LOW ( 0 ) | HIGH ( 1 ) |

(FILM WINDING)

(A) POLARITY (S→N)

(B) READ VOLTAGE (C) READ DATA PULSE (D) BINARY PULSE VALUE (E) SERIAL - PARALLEL CONVERSION

FIG. 13A

MD READ
MD NOT READ ─────────────────────────────

LEADING END OF FILM          LEADING END OF FILM

FIG. 13B

MD READ ─────────────────────────────
MD NOT READ

LEADING END OF FILM          LEADING END OF FILM

FIG. 13C

MD READ ─────────────┐
MD NOT READ          └───────────────

LEADING END OF FILM          LEADING END OF FILM

FIG. 13D

MD READ              ┌───────────────
MD NOT READ ─────────┘

LEADING END OF FILM          LEADING END OF FILM

FIG. 13E

MD READ ──────┐   ┌──────────────────
MD NOT READ   └───┘

LEADING END OF FILM          LEADING END OF FILM

FIG. 13F

MD READ       ┌──────────────────┐
MD NOT READ ──┘                  └───

LEADING END OF FILM          LEADING END OF FILM

APPARATUS AND METHOD FOR FEEDING A FILM

BACKGROUND OF THE INVENTION

1. Field of the Invention

The present invention relates to an apparatus and method for feeding photographic film and, particularly to a film feeding apparatus and method for unwinding or rewinding a film, compatible with the APS (advanced photo system) in a cartridge in order to read magnetic data recorded on the film.

2. Discussion of the Related Art

Magnetic data are written on an APS film by a photo processing apparatus or camera, and the written magnetic data are subsequently read by a magnetic head during the scanning of the film image.

At this time, the magnetic data may fail to be read due to the amount of magnetic data to be recorded by a camera used for photographing, treatment liquids used to develop film, the condition of the magnetic reading device when the magnetic data are read, and other factors. When data is incorrectly read, the operator is notified of the error via a monitor. If the operator gives a command to reread the image data in response to the notification, scanning is performed again to reread the magnetic data.

Since only one chance to read the magnetic data is provided only during scanning in prior art devices, there is a high probability of failing to read the magnetic data. If the magnetic data are not read, scanning needs to be performed again. Thus, a longer amount of time is needed to read the magnetic data properly, and these devices have poor operability.

When the magnetic data are reread, they are read under the same conditions (i.e., at the same speed) at every scanning. Accordingly, if the film data was poorly recorded and/or the recording density of the magnetic data was very high or very low, the magnetic data may not be read despite repeated attempts to reread. This leads not only to poor operability, but also to a reduction in the reliability of the apparatus.

SUMMARY OF THE INVENTION

In view of the above, an object of the present invention is to provide a film feeding apparatus and method having improved operability and reliability.

In order to accomplish the above and other objects and advantages, the present invention is directed to a photographic film feeding apparatus for feeding film having magnetic data recorded on the film comprising a storage means for storing the magnetic data for each frame, a first reading means for reading the magnetic data of each frame while the film is being fed and then storing the read magnetic data in the storage means, a first judging means for judging, based on the information stored in the storage means, whether there is a frame whose magnetic data was not read, and a second reading means for changing a reading condition if there is a frame whose magnetic data has not been read yet, reading the magnetic data again and then storing the read magnetic data in the storage means.

In the present film feeding apparatus, the magnetic data are read again after changing the reading condition if it was judged, based on the information on the magnetic data of the a respective frames which were read while the film was being unwound, that there was a frame whose magnetic data had not been read yet or was not properly read. By changing the reading condition, there is a higher probability of reading the magnetic data which was not read while the film was unwound. As a result, the reading rate of the magnetic data can be improved.

In a preferred embodiment, the second reading means comprises means for reading the magnetic data while the film is being rewound. With this construction, the magnetic data are read again while the film is rewound to its leading end if the magnetic data failed to be read during the unwinding of the film. Thus, this reading condition is different from when the film was unwound (the film feeding direction is reversed), and the chance of successfully reading the magnetic data is increased. Therefore, the reading rate of the magnetic data is greatly improved.

The first reading means preferably reads the magnetic data by intermittently feeding the film frame by frame, and the second reading means preferably reads the magnetic data by continuously feeding the film. Thus, the reading condition of the magnetic data when the film is rewound is different from when the film is unwound.

Preferably, a rereading means is also provided for changing the reading condition again if there is a frame whose magnetic data has not been read even after rewinding the film, rereading the magnetic data, and storing the read magnetic data in the storage means. With this construction, the possibility of reading the magnetic data increases, and thus the reading rate of the magnetic data is further improved.

Preferably, the reading means comprises means for notifying an operator that there is a frame whose magnetic data has not been read yet even after rewinding the film, and means for changing the feeding speed of the film based upon a command from the operator to reread the magnetic data again. Thereafter, the magnetic data is reread by the apparatus. By rereading the magnetic data again after changing the feeding speed of the film in response to a command from the operator, the magnetic data can be read to conform to its recording density, if necessary. As a result, the reading rate of the magnetic data is improved even more.

Preferably, the storage means stores flags indicative of the magnetic data of each frame and the presence or absence of the magnetic data for each frame. The judging means comprises a second judging means for judging, based on the flags stored in the storage means, whether there is any frame whose magnetic data has not been read yet. For example, the second judging means refers to the flags and judges that a reading error occurred in reading the magnetic data for a frame, for which no magnetic data has been read, and if the presence/absence of the magnetic data between adjacent or successive frames has changed twice or more. Thus, the judgment as to whether there is any frame whose magnetic data has not been read yet can be made in the case where no magnetic data is recorded on the film, the case where the film is exposed from its intermediate frame, and the case where the film is exposed to its intermediate frame.

Further, if there is still a frame whose magnetic data has not been read by the magnetic data reading during the unwinding of the film, the second reading means may change the feeding speed of the film after the film is rewound and may reread the magnetic data. By changing the feeding speed of the film and the reading condition during the second film reading (i.e., rewinding), the probability of reading the magnetic data which could not be read during the first film unwinding increases, and the reading rate of the magnetic data can be improved.

The present invention is also directed to a feeding method for feeding a film so that magnetic data recorded on the film can be read, comprising reading magnetic data frame by frame while the film is being fed and storing the read information as magnetic data for each frame in a storage means, judging base on the information stored in the storage means whether there is any frame whose magnetic data has not been read yet, reading the magnetic data during the rewinding of the film if there is a frame whose magnetic data has not been read yet and storing the information as magnetic data in the storage means, judging based on the information stored in the storage means whether there is any frame whose magnetic data has not been read yet, notifying an operator that there is some frame whose magnetic data has not been read yet, changing the feeding speed of the film and rereading the magnetic data.

According to this method, the magnetic data are read frame by frame during the unwinding of the film. If there is any frame whose magnetic data has not been correctly read yet, the magnetic data are read again during the rewinding of the film. If there is still a frame whose magnetic data has not been read even after the film was rewound, the operator is notified. If the operator gives a command to reread the magnetic data again, the magnetic data are reread again after changing the feeding speed of the film. Since the magnetic data are also read during the rewinding of the film and are, if necessary, reread after changing the feeding speed of the film, the reading rate of the magnetic data is greatly improved.

BRIEF DESCRIPTION OF THE DRAWINGS

These and other objects, features and advantages of the present invention will become more apparent upon a reading of the following detailed description and accompanying drawings in which:

FIG. 1A is a schematic plan and FIG. 1B is a front view of a film feeding apparatus according to one embodiment of the present invention.

FIG. 5 is a table showing the operation of a pulse inverter.

FIGS. 13A to 13F are charts showing criteria for judging whether the magnetic data have been read.

DETAILED DESCRIPTION OF THE PREFERRED EMBODIMENTS

Figure 2:
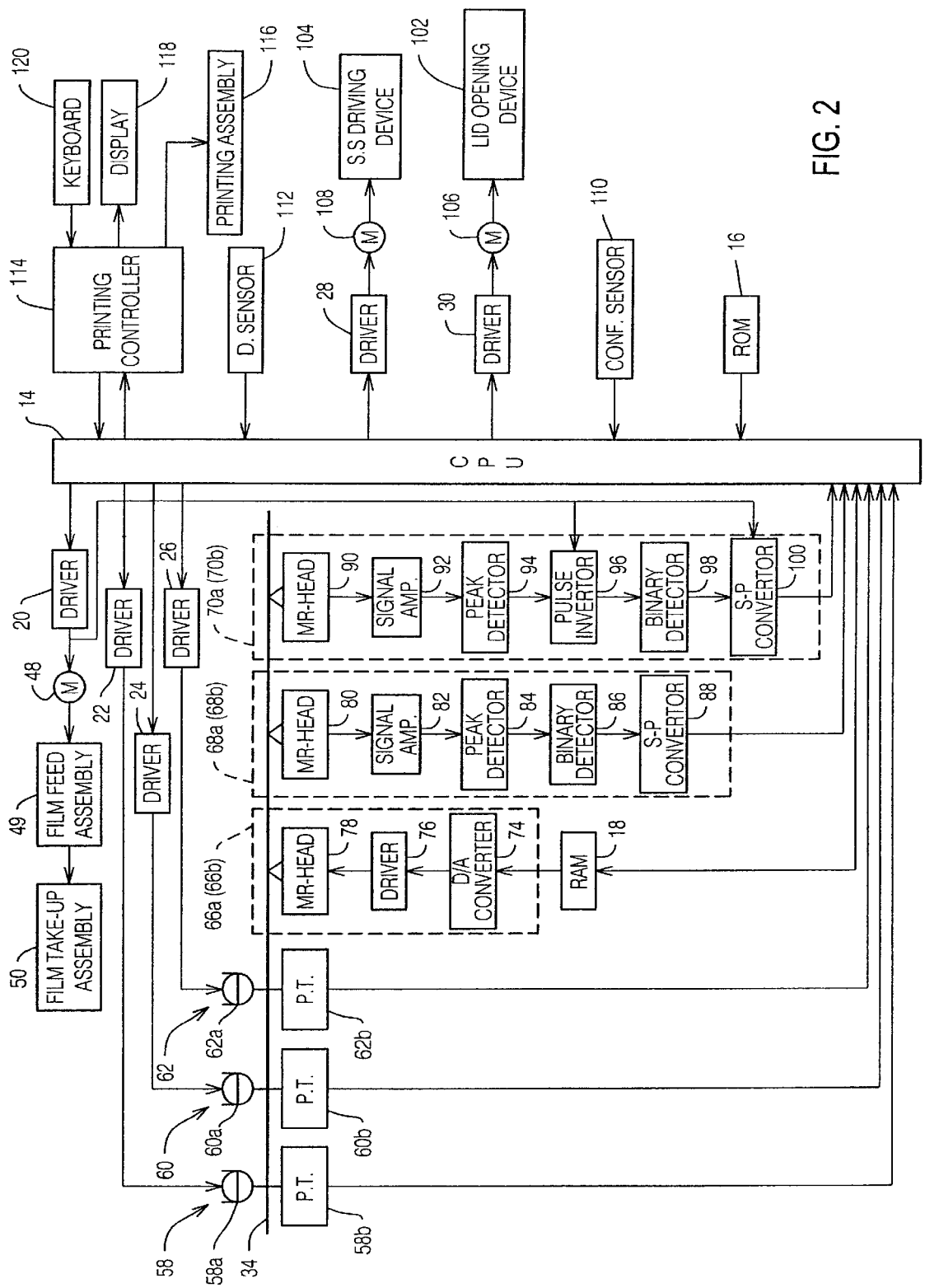
FIG. 2 is a block diagram of one embodiment of the present invention.

With reference to FIGS. 1 and 2, the film feeding apparatus 10 according to this embodiment is used in a photo processing apparatus for scanning and printing image information of a photographic film such as an APS film. The film feeding apparatus 10 includes a film feed controller 12 for controlling the operation of the film feeding apparatus 10. The film feed controller 12 includes an assembly of a CPU 14, a ROM 16, a RAM 18 and a plurality of drivers 20 to 30.

Programs for various controls of the CPU 14 are stored in the ROM 16, whereas data necessary for controlling operations by the CPU 14 are temporarily stored in RAM 18. Specifically, the data to be stored in RAM 18 include a flag (0 indicates the presence of magnetic data, 1 indicates the absence thereof) for each frame 51 (described later), and the magnetic data 54 and 55. The magnetic data 54, 55 each contain e.g. several bytes of information where one byte is 8-bit data consisting of 1-bit parity and 7-bit data.

Data on the rotating speed of the film feeding motor 48 (described later) is also stored in RAM 18. It may, however, be stored in ROM 16 if set up in advance.

The film feeding apparatus 10 includes a feed path 36, which serves as a path for feeding film 34 contained in a cartridge 32 in the directions indicated by the arrow X. Pairs of feed rollers 42, 44, 46 are arranged substantially at regular intervals along the feed path 36 from the loading side 38 toward the unloading side 40 in such a manner as to hold the film 34 in between. The pairs of feed rollers 42, 44, 46 are comprised of drive rollers 42a, 44a and 46a arranged at the upper side of the film 34 and pressing rollers 42b, 44b and 46b arranged at the lower side of the film 34, respectively.

If a control signal from the CPU 14 of the film feed controller 12 is sent via the driver 20 to the film feeding motor 48 (made of a pulse motor or stepping motor), the film feeding motor 48 synchronously drives the feed rollers 42, 44, 46 via a film feed assembly 49, i.e., a transmission means (not shown), to rotate them. The film feeding motor 48 is controlled by the CPU 14 such that the film 34 is intermittently fed frame by frame when the film 34 is dispensed from the cartridge 32 and is continuously fed at a constant speed when the film 34 is rewound into the cartridge 32.

Here, a first film unwinding speed, a second and subsequent film unwinding speed which is slower than the first film unwinding speed, and a film rewinding speed are set as rotating speeds for the film feeding motor 48. The reason why the second and subsequent film unwinding speed is slower than the first one is that the reading frequently ends in failure due to a high recording density of the magnetic data 55. However, the second and subsequent film unwinding speed may also be set faster. The rotating speed of the film feeding motor 48 may be selected from several speeds set in advance or may be set by an operator as desired. The film feed assembly 49 drives a film take-up assembly 50 for taking up the film 34.

Figure 3A:
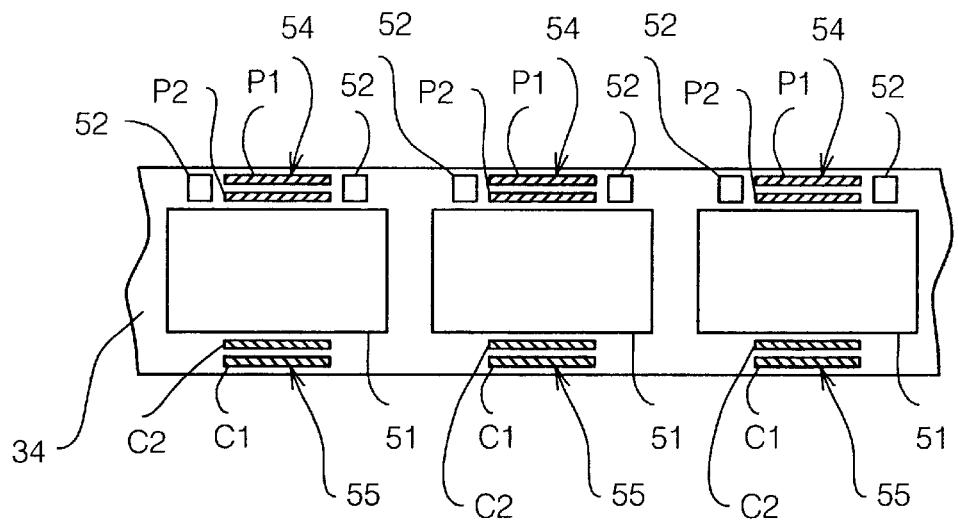
FIG. 3A is a top view illustrating recording positions of the magnetic data.
Figure 3B:
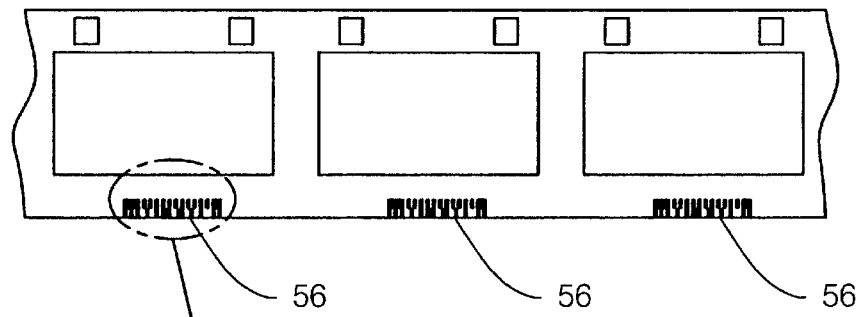
FIG. 3B is a top view illustrating recording positions of the bar codes.
Figure 3C:
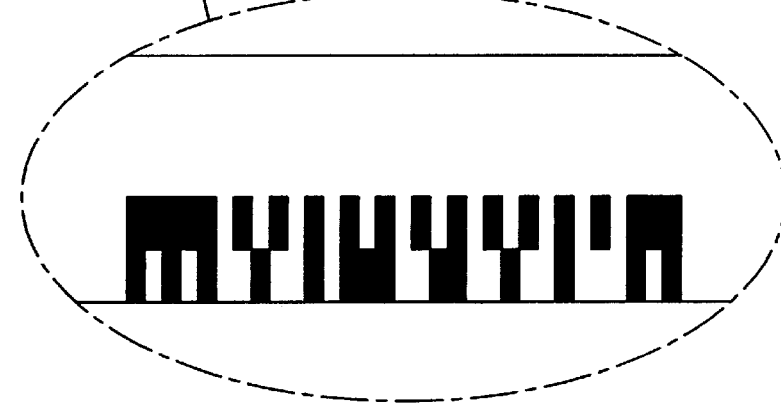
FIG. 3C is an exploded view of one bar code of FIG. 3B.
Figure 4:
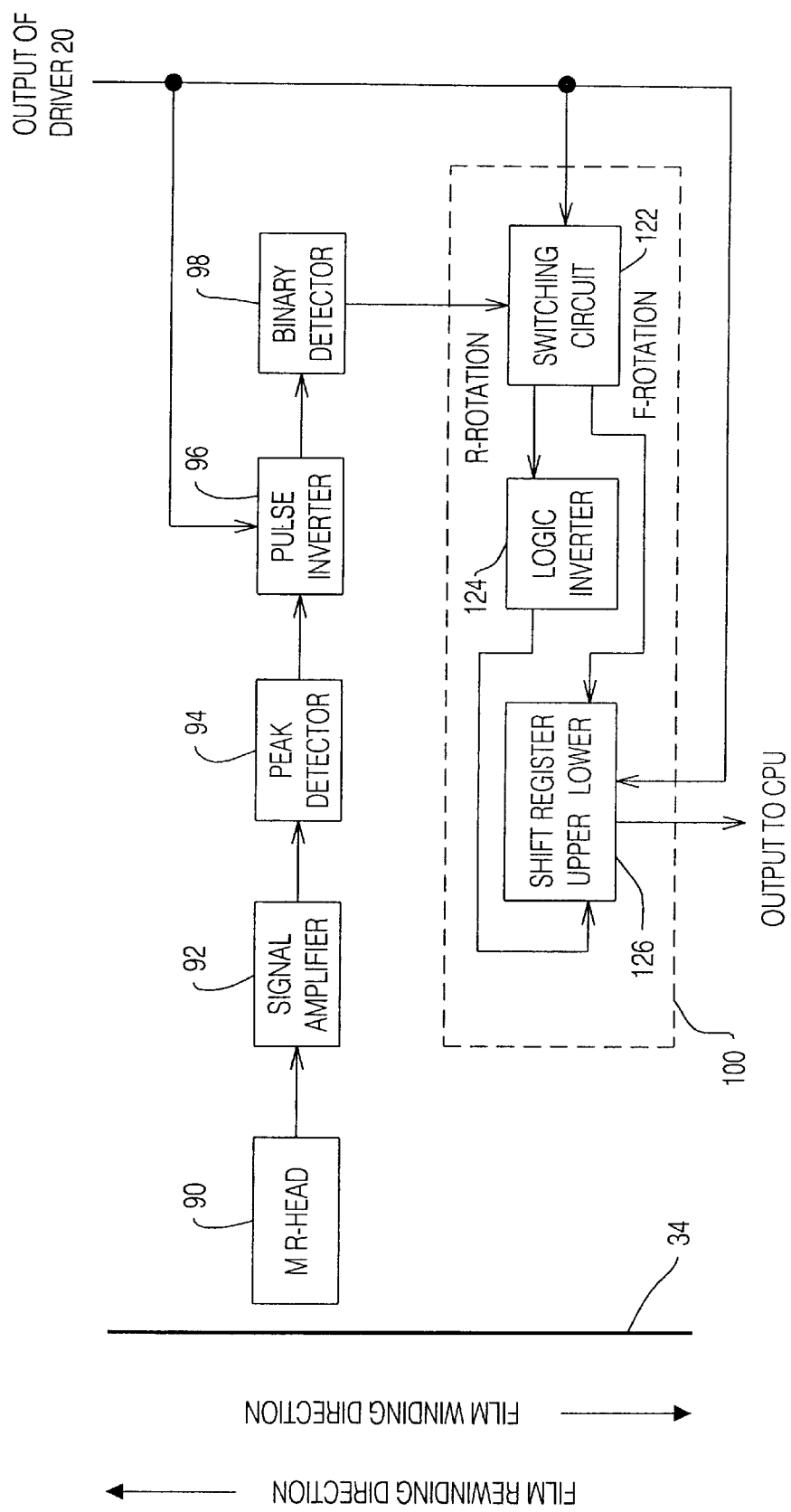
FIG. 4 is a block diagram illustrating a magnetic reading apparatus.

As shown in FIG. 3, two perforations 52 are formed so as to correspond to each frame 51 at one end of the film 34 with respect to the widthwise direction thereof. Between the corresponding pair of perforations 52 are tracks P1, P2 on which the magnetic data 54 are recordable by the film feeding apparatus 10. At the other side of the film 34 with respect to the widthwise direction thereof, there are tracks C1, C2 on which the magnetic data 55 is recordable by a camera (not shown) and by using bar codes (DX codes) 56 as shown in FIGS. 3B and 3C.

The magnetic data 54 include information such as print colors, density correction value and photographing information used in the camera (e.g., shutter speed, aperture value, date, place and time of photographing, etc.). The bar code 56 includes information such as an ID number and frame number optically imprinted at the manufacturing stage of the film 34. Since the relative positions of the frames 51 with respect to the corresponding perforations 52 are always the same, the position of the frame 51 can be confirmed by detecting the perforations 52.

Referring back to FIGS. 1 and 2, a film end sensor 58 for detecting the leading end of the film 34 is provided between the cartridge 32 and the pair of feed rollers 42. Between the pairs of feed rollers 42 and 44, a perforation sensor 60 is provided for detecting the perforations 52 at one end of the film 34 with respect to its widthwise direction and bar code sensors 62 for detecting the bar codes 56 at the other end of the film 34 with respect to its widthwise direction. The bar code sensors 62 also detect an end perforation (not shown) to determine whether the film 34 has been unwound up to the last frame 51. The film end sensor 58, the perforation sensor 60 and the bar code sensors 62 are each comprised of a pair of an LED 58a and a phototransistor 58b, a pair of an LED 60a and a phototransistor 60b and a pair of an LED 62a and a phototransistor 62b, respectively. The LEDs 58a, 60a, 62a are driven by drivers 22, 24, 26, respectively. The detection signals of the phototransistors 58b, 60b, 62b are provided to the CPU 14.

In the vicinity of the pair of feed rollers 44, a magnetic data reading/writing unit 64 is provided to extend in a direction normal to the feed path 36. The unit 64 is comprised of a magnetic writing device 66a for the track P1, a magnetic writing device 66b for the track P2, a magnetic reading device 68a for the track P1, a magnetic reading device 68b for the track P2, a magnetic reading device 70a for the track C1 and a magnetic reading device 70b for the track C2. A film pressing unit 72 is provided in the exposure position between the pairs of feed rollers 44 and 46.

The magnetic writing device 66a writes the colors, the density correction value and other information on the film 34, for example, while the film 34 is taken up after printing. In the magnetic writing device 66a, the data stored in RAM 18 are converted into analog signals by a digital-to-analog (D/A) converter 74. The magnetic data 54 is written on the film 34 by a magnetic write head 78 in accordance with the voltage applied by a driver 76 based on the obtained signal. The magnetic writing device 66b is constructed and operated substantially in the same manner as the magnetic writing device 66a, and therefore it is not illustrated or described again here.

The magnetic reading device 68a reads the magnetic data 54, for example, during scanning. In the magnetic reading device 68a, the magnetic data 54 written by the film feeding apparatus 10 or the like are read by a magnetic read head 80 and is analog-to-digital (A/D) converted after being amplified by a signal amplifier 82. Specifically, the magnetic data 54 is converted into a data pulse having a rectangular waveform by a peak detector 84, and digitized by a binary detector 84. After being converted into parallel data by a serial-parallel converter 88, the digitized magnetic data 54 are fed to the CPU 14 and stored in RAM 18. Since the magnetic reading device 68b is constructed and operated substantially in the same manner as the magnetic reading device 68a, it is neither illustrated nor described again here.

The magnetic reading device 70a reads the magnetic data 55, for example, during scanning, and its read result is used to judge whether the magnetic data 54 and 55 should be read again. By using the magnetic data 55 written by the camera, the device can judge whether the magnetic data 54 and 55 should be read again and whether any of the magnetic data essential for the treatment of the film 34 have been properly read.

As will be described in detail later, the driver 20 sends a signal representing the rotating direction of the film feeding motor 48, i.e. whether the film 34 is to be unwound or rewound, to the magnetic reading device 70a. The magnetic reading device 70a in turn reads the magnetic data 55 in accordance with the received signal. The magnetic read head 90 reads the magnetic data which is A/D converted after being amplified by a signal amplifier 92. Specifically, the magnetic data 55 is converted into a data pulse having a rectangular waveform, digitized by a binary detector 98 after passing through a pulse inverter 96 which operates in response to the output of the driver 20, and is sent to a serial-parallel converter 100 which operates in response to the output of the driver 20. After being converted into parallel data by the serial-parallel converter 100, the digitized magnetic data 55 is sent to the CPU 14 and stored in RAM 18. Based on the information represented by the magnetic data 55 stored in RAM 18, the CPU 14 judges whether the magnetic data 54 and 55 should be read again. The magnetic reading device 70b is constructed and operated substantially in the same manner as the magnetic reading device 70a, and therefore it is neither illustrated nor described again here.

The cartridge 32 is formed with a lid opening portion 102 for opening and closing cartridge shading lid (light-lock door), not shown, and a cartridge spool shaft driving device 104 for rotating the cartridge spool, not shown. The lid opening portion 102 and the driving device 104 are respectively driven by a lid opening motor 106 and a spool shaft drive motor 108, which are both pulse motors or stepping motors, in order to open the cartridge shading lid and wind the film 34.

On one surface of the cartridge 32, a confirmation sensor 110, comprised of, e.g. a limit switch for confirming whether the film 34 is developed or undeveloped, is arranged in a position corresponding to a developed film mark (not shown). Whether the film 34 is developed or undeveloped is detected based on whether the limit switch has been pushed by the developed film mark. In the vicinity of one side of the cartridge 32, a detection sensor 112 is provided. The sensor 112 is made of, e.g. a limit switch for detecting whether or not the cartridge 32 is mounted in the film feeding apparatus 10. The detection signals of the confirmation sensor 110 and the detection sensor 112 are sent to the CPU 14.

A printing controller 114 controls a printing assembly 116 and a display 118 in accordance with control signals from the CPU 14. The printing assembly 116 prints image information for the frame 51 located in the exposure position on printing paper (not shown). The results of the CPU 14 operation and the like are shown on display 118. Whether the magnetic data 54 and 55 are to be read again is judged in accordance with input provided by an operator by means of a keyboard 120. Further, the rotating speed of the film feeding motor 48 can be set by the keyboard 120.

Hereafter, the magnetic reading device 70a is described with reference to FIGS. 4, 5, 6A and 6B.

As described above, in the magnetic reading device 70*a*, the magnetic data 55 are read by the magnetic read head 90, converted into a data pulse having a rectangular waveform by the peak detector 94 after being amplified by the signal amplifier 92, and then sent to the pulse inverter 96. The pulse inverter 96 is comprised of, e.g. an exclusive (XOR) circuit, and performs an "exclusive or" operation for the output of the driver 20 representing the rotating direction of the film feeding motor 48 and the data pulse from the peak detector 94 as shown in FIG. 5. The obtained data pulse is then output to the binary detector 98.

The binary detector 98 performs a binary operation (detects either 1 or 0) depending on which is closer to the data pulse: 1) the trailing edge of the film leading end side or 2) the film near end side of the leading edge (i.e., the point where low level changes to high level). A binary data "0" is provided to a switching circuit 122 of the serial-parallel converter 100 if the leading edge is closer to the film leading end side. A binary data "1" is provided to the switching circuit 122 if the leading edge is closer to the film rear end side.

The switching circuit 122 is controlled in accordance with the output of the driver 20 representing the rotating direction of the film feeding motor 48. Then the switching circuit 122 sends the binary data to a logic inverter 124 when the film feeding motor 48 is rotated in the reverse direction while sending it directly to a shift register 126 when the film feeding motor 48 is rotated in the forward direction. The logic inverter 124 is comprised of, e.g. an inverter to output the binary data to the shift register 126 after inverting it.

Figures 6A, 6B:
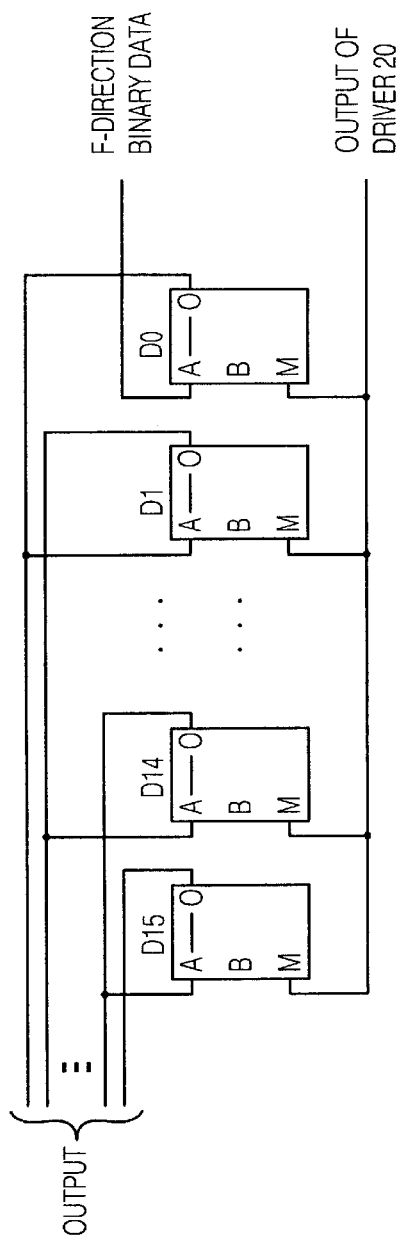
FIG. 6A is a block diagram of a shift register illustrating that the motor is rotated in a forward direction.
FIG. 6B is a block diagram of a shift register illustrating the connection state when the film feeding motor is rotated in the reverse direction.

The shift register 126 includes shifting circuits D0 to D15 as shown in FIGS. 6A and 6B and it outputs 16-bit parallel data after performing a serial-to-parallel conversion. The shifting circuits D0 to D15 are each comprised of, for example, a switching circuit and a flip-flop, and the input ports thereof are switched in accordance with the output of the driver 20 representing the rotating direction of the film feeding motor 48. The input position of the binary data (whether the binary data is to be stored from the highest numbered shifting circuit or from the lowest numbered shifting circuit) and the shifting direction are also switched by switching the connection of the shifting circuits as shown in FIGS. 6A and 6B. In FIGS. 6A and 6B, A, B, M, O denote input ports during the forward rotation of the motor 48, input ports during the reverse rotation of the motor 48, the output of the driver 20 representing the rotating direction of the film feeding motor 48 and output ports, respectively.

When the binary data from the binary detector 98 becomes 16 bits, the serial-parallel converter 100 sends a corresponding signal to the CPU 14. The magnetic data includes a start sentinel (SS) and an end sentinel (ES) representing the start and end of each data stream. Since these bit patterns are determined, the serial-parallel converter 100 is able to check the bit pattern upon the output of each bit of binary data. When the leading end of the magnetic data 55 of each frame 51 is detected, it sends the information to the CPU 14. Even while checking the bit pattern, the sentinel to be detected is switched according to the output of the driver 20 representing the rotating direction of the film feeding motor 48. The start sentinel SS is detected during the unwinding of the film (forward rotation), whereas the end sentinel ES is detected during the rewinding of the film (reverse rotation).

Next, the magnetic data reading by the magnetic reading device 70*a* is described with reference to FIGS. 7 and 8. First, the case where the film 34 is unwound (i.e., forward rotation) is described.

The CPU 14 drives the film feeding motor 48 by outputting a command that causes the film feeding motor 48 to rotate in the forward direction and by outputting a pulse having a specific cycle to the driver 20 in accordance with the control program stored in ROM 16. This causes the film feed assembly 49 and the film take-up assembly 50 to operate, thereby feeding the film 34 to a desired position. At this time, if the magnetic data 55 are recorded on the film 34 to be treated, the magnetic polarities of the magnetic data 55 shown in part A of FIG. 7 are detected by the magnetic read head 90 when it passes over the film 34.

Figure 7:
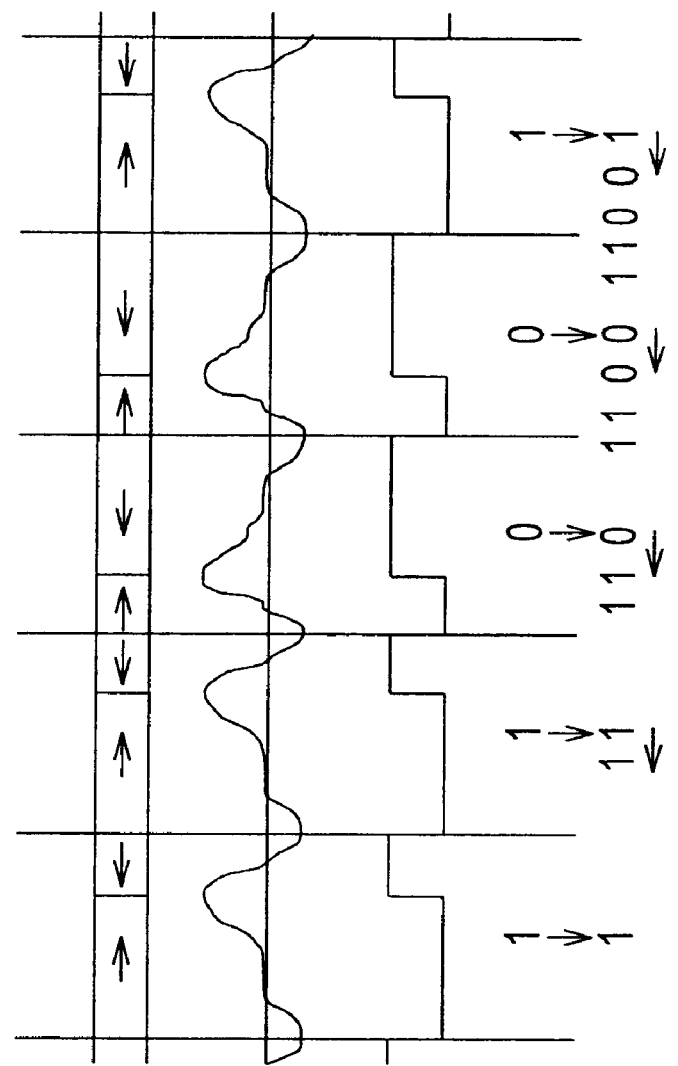
FIG. 7 illustrates several waveform charts showing signals for the respective elements of a magnetic reading device during the unwinding of the film.

The signal amplifier 92 detects a change in the voltage, amplifies the voltage and outputs the voltage as shown in part B of FIG. 7. Based on this voltage, the peak detector 94 outputs low-level signals at peaks in the negative direction while outputting high-level signals at peaks in the positive direction. Accordingly, a data pulse having a rectangular waveform as shown in part C of FIG. 7 is obtained and is sent to the pulse inverter 96.

Since the film feeding motor 48 is rotated in the forward direction in this case, the data pulse is sent to the binary detector 98 as it is. The binary detector 98 sends the binary data as shown in part D of FIG. 7 to the serial-parallel converter 100. In the serial-parallel converter 100, the bit shifting direction of the binary data is determined based on the output of the driver 20 before performing a serial-to-parallel conversion. In this case, parallel data as shown in part E of FIG. 7 is outputted from the serial-parallel converter 100 and stored in RAM 18 via the CPU 14.

Next, the case where the film 34 is rewound (i.e., the reverse direction) is described.

The CPU 14 drives the film feeding motor 48 by outputting a command that causes the film feeding motor 48 to rotate in the reverse direction and by outputting a pulse having a specific cycle to the driver 20 in accordance with the control program stored in ROM 16. This causes the film feed assembly 49 and the film take-up assembly 50 to operate, thereby rewinding the film 34. At this time, if the magnetic data 55 recorded on the film 34 is read, the magnetic polarities of the magnetic data 55 shown in part A of FIG. 8 are detected by the magnetic read head 90 as it passes over the film 34.

Figure 8:
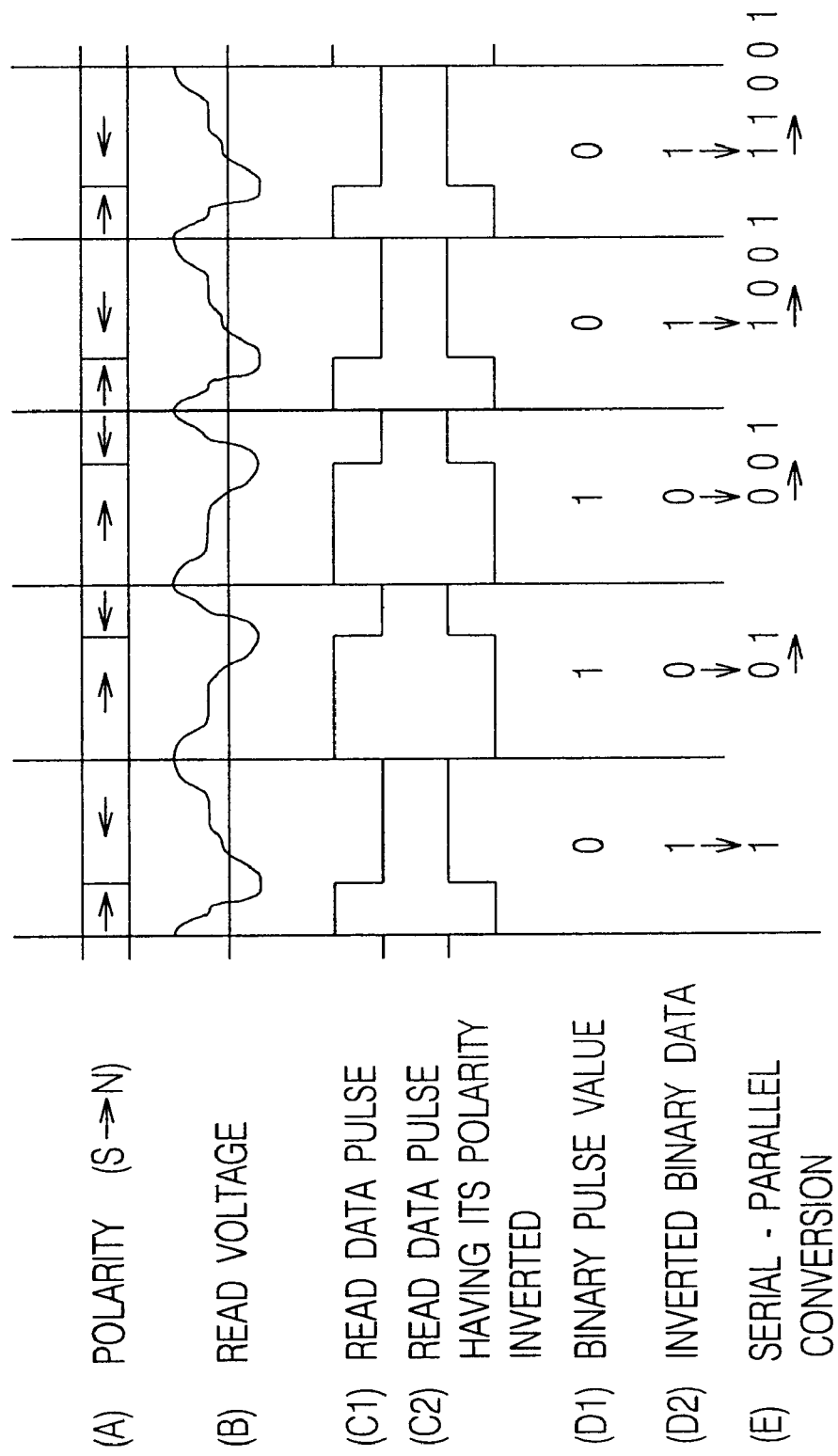
FIG. 8 illustrates several waveform charts showing signals for the respective elements of the magnetic reading device during rewinding of the film.

The signal amplifier 92 detects a change in the voltage, amplifies the voltage and outputs the voltage as shown in part B of FIG. 8. Based on this voltage, a data pulse having a rectangular waveform as shown in part C1 of FIG. 8 is obtained in the peak detector 94 and output to the pulse inverter 96.

When rewinding the film 34 (i.e., reverse rotation), the magnetic polarities of the magnetic data 55 are read in the reverse direction from when the film 34 is unwound. Accordingly, as shown in parts A of FIGS. 7 and 8, the magnetic polarities at the time of rewinding the film 34 are the reverse of those obtained when unwinding the film 34. Thus, the output voltage from the signal amplifier 92 and the data pulse from the peak detector 94 are as shown in parts B and C1 of FIG. 8, respectively. As described above, the polarities of the output voltage and the data pulse are inverted since the magnetic polarities are read in the reverse direction. Accordingly, in order to enable a binary conversion (binary transformation), the polarity of the data pulse from the peak detector 94 is inverted by the pulse inverter 96 before the binary conversion to generate a data pulse as shown in part C2 of FIG. 8.

The binary detector 98 performs a binary conversion of this data pulse to obtain the binary data shown in part D1 of FIG. 8, which is then sent to the serial-parallel converter 100. In this case, since the polarities are inverted once when the data pulse shown in part C2 of FIG. 8 is generated as described above, the binary data shown in part D1 of FIG. 8 is data having polarities reverse from those of the original data which should be generated and, therefore, should be restored to the original data. Accordingly, the binary data shown in part D of FIG. 8 are inverted by the logic inverter 124 of the serial-parallel converter 100 to generate the binary data shown in part D2 of FIG. 8, which is then sent to the shift register 126. The binary data shown in part D2 of FIG. 8 is the same as the one obtained by rearranging the binary data (part D of FIG. 7), which was obtained during the unwinding of the film 34 (i.e., forward rotation).

In the shift register 126, the bit shifting direction of the binary data from the binary detector 98 is determined based on the output of the driver 20 before performing a serial-parallel conversion. In this case, the parallel data as shown in part E of FIG. 8 are outputted by reversing the bit shifting direction of the binary data and is stored in RAM 18 via the CPU 14. In this way, the magnetic data 55 can be satisfactorily read by changing the reading operation depending upon whether the film 34 is unwound or rewound.

The magnetic reading device 70a is described above. It should be noted that the magnetic reading device 70b is similarly constructed and operated.

The magnetic data reading operation of the film feed apparatus 10 is now described with reference to FIG. 9. First, whether or not the cartridge 32 containing the film 34 is set is detected by the detection sensor 112 (Step S1). The apparatus 10 waits on standby unless the cartridge 32 is set, whereas the magnetic data reading operation as described later is performed (Step S3) if the cartridge 32 is set. Then, whether or not the film 34 has been unwound to the last frame 51 is determined (Step S5). The magnetic data continue to be read until the film 34 is unwound to the last frame 51. Once the film is unwound to the last frame 51, whether or not there is any frame 51 whose magnetic data 55 has not been read yet is determined by an operation to be described later.

If there is a frame 51 whose magnetic data 55 has not been read yet, the film 34 is rewound (Step S9). At this time, the film 34 is continuously fed. Then, the magnetic data reading operation is performed again (Step S11) and whether or not the film 34 has been rewound to its leading end is determined by the perforation sensor 60 (Step S13). This flow returns to Step S9 unless the film 34 has not been rewound yet to its leading end, and whether or not there is any frame 51 whose magnetic data 55 has not been read yet is determined (Step S15) once the film 34 is rewound to its leading end.

If there is still a frame 51 whose magnetic data 55 has not been read yet, whether the magnetic data 55 should be read again is judged (Step S17). At this time, the operator is notified if there is a frame 51 whose magnetic data 55 has not been read yet by means of the display 118 or the like so that the operator will know whether the magnetic data 55 should be reread. If the operator gives the command to reread the magnetic data 55 by means of the keyboard 120, the feeding speed of the film 34 is changed by the operator or automatically (Step S19), and this flow returns to Step S3 to reread the magnetic data 55. If the operator does not give the command as above in Step S17, the magnetic data reading operation ends after the printing operation is performed (Step S21). Thus, the magnetic data 55 is reread as long as the operator continues to give a command to reread. If in Step S15, there is no frame 51 whose magnetic data 55 has not been read yet, Step S21 follows.

Further, if, in Step S7, there is no frame 51 whose magnetic data has not been read, the film 34 is rewound (Step S23). After the film 34 is rewound to its leading end (i.e., "YES" in Step S23), Step S15 follows. In this case, the magnetic data reading operation ends after the printing operation is performed without rereading the magnetic data 55. It should be noted that the magnetic data 54 is also read during the magnetic data reading and rereading operations in FIG. 9.

Next, the detail of the operation in Step S3 is described with reference to FIG. 10. First, the film 34 is unwound by one frame (Step S31), and the magnetic data 55 is read and stored in RAM 18 (Step S33). Then, whether or not the film 34 has been unwound by one frame is determined (Step S35), and, if not, this flow returns to Step S31.

After the film 34 is unwound by one frame, whether or not the magnetic data 55 are present in RAM 18 is determined (Step S37). If the magnetic data 55 are present, whether or not the magnetic data 55 has missing parts, inverted bits or inverted parity bits are determined (Step S39). If the magnetic data 55 has neither a missing part nor an inverted bit nor an inverted parity bit, the presence of the magnetic data is judged, and a flag in RAM 18 indicative thereof is set in RAM 18 (Step A41), and the flow ends.

If the magnetic data 55 has missing parts or inverted bits in Step S39, whether or not the magnetic data 55 is restorable is determined (Step S43). Since the magnetic data 55 is 8-bit data comprised of 1-bit party and 7-bit data, whether or not the magnetic data 55 is restorable can be judged by, for example, judging whether or not an error is found in one or less bit using a known error detecting method. If restorable, the magnetic data 55 are restored using a known error correcting method, and then Step S41 follows. On the other hand, if the magnetic data 55 is absent in Step S37 or if the magnetic data 55 is judged not to be restorable in Step S43, the absence of the magnetic data is judged, and a flag in RAM 18 indicative thereof is set (Step S45), and the flow ends.

In this way, the magnetic data 55 is read frame by frame while the film 34 is intermittently unwound frame by frame. Thereafter, the presence or absence of the magnetic data 55 is judged for each frame 51. This operation can handle the case where the magnetic data 55 are erroneously read.

Figure 10:
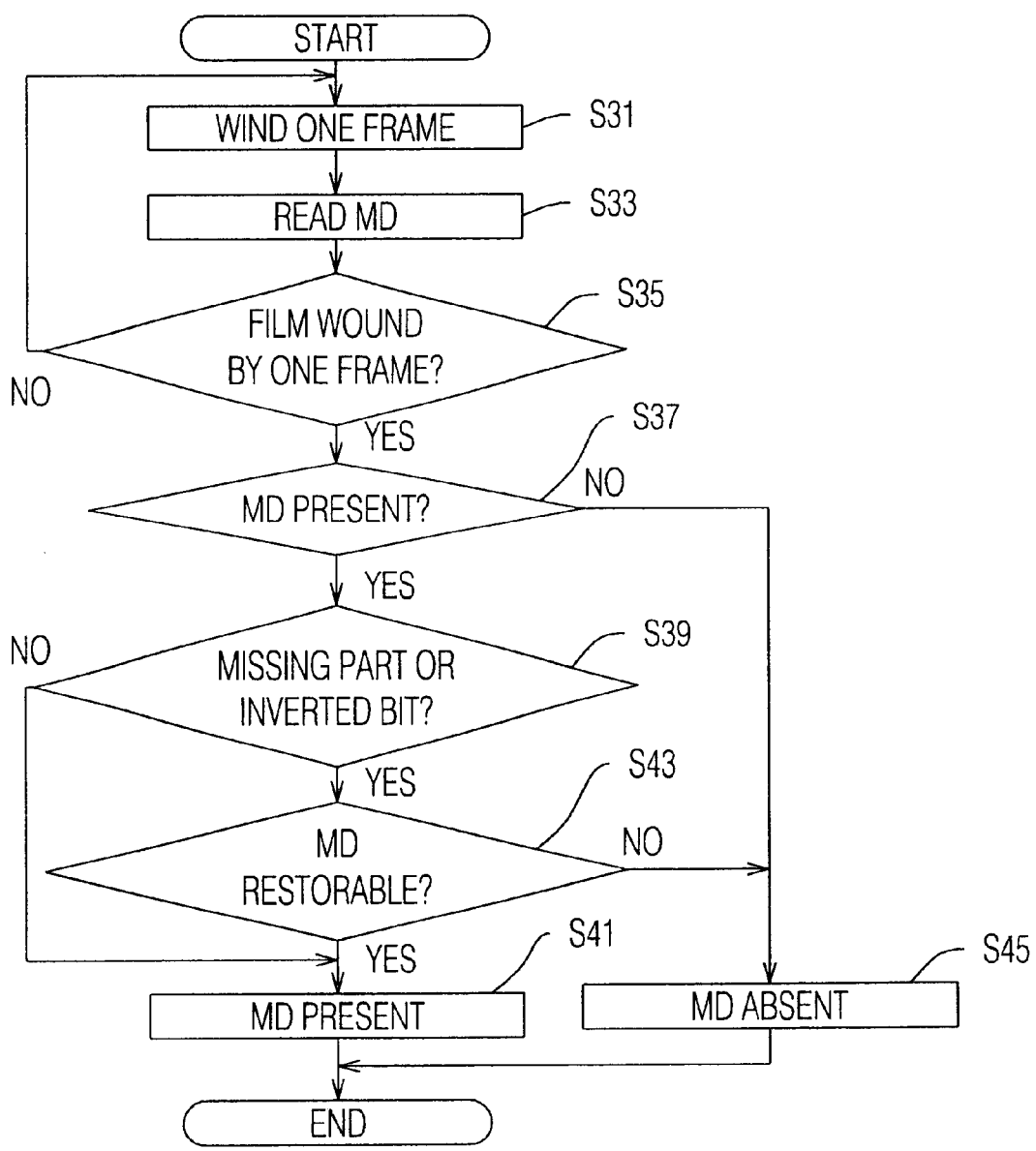
FIG. 10 is a flow chart illustrating the magnetic data reading Step S3 of FIG. 9 in greater detail.

The magnetic data reading operation at the time of the film rewinding in Step S11 is performed by the operations of Steps S33 to S45 excluding Step S31 of FIG. 10. At this time, the flow returns to Step S33 if the result in Step S35 is negative. In this way, when the film is rewound, the magnetic data 55 of the respective frames 51 of the film 35 being continuously fed are successively read, and then the presence or absence of the magnetic data 55 is judged for each frame 51.

Next, the details of Steps S7 and S15 are described with reference to FIGS. 11 and 12.

A flag is present in RAM 18 for each frame 51 regardless of whether or not the magnetic data 55 has been properly read from the track C1 of the first frame, i.e., the magnetic data 55 is present in the track C1 of the first frame (Step S51). The presence of the magnetic data 55 in the track C1 of the first frame is stored in RAM 18 (Step S53) if the magnetic data 55 has been properly read. In contrast, the absence thereof is stored in RAM 18 (Step S55) if the magnetic data 55 has not been properly read.

After Steps S53 and S55, whether the magnetic data 55 has been properly read from the track C2 of the first frame is determined (Step S57). The presence of the magnetic data 55 in the track C2 of the first frame is stored in RAM 18 (Step S59) if the magnetic data 55 has been properly read. In contrast, the absence thereof is stored in RAM 18 (Step S61) if the magnetic data 55 has not been properly read.

After Steps S59 and S61, whether the magnetic data 55 has been properly read from the track C1 of the succeeding frame is determined (Step S63). If the magnetic data 55 has been properly read, the presence of the magnetic data 55 in the track C1 of the succeeding frame is stored in RAM 18 (Step S65) and whether the magnetic data 55 is present for the previous frame 51 is determined (Step S67). If the magnetic data 55 is absent in the previous frame 51, the change in the presence/absence of the magnetic data 55 from the previous frame 51 is stored in RAM 18 (Step S69).

On the other hand, if the magnetic data 55 is determined not to have been properly read in Step S63, the absence of the magnetic data 55 in the track C1 of the succeeding frame 51 is stored in RAM 18 (Step S71), and whether the magnetic data 55 is present for the previous frame 51 is determined (Step S73). Step S69 follows if the magnetic data 55 is present for the previous frame 51.

Figure 12:
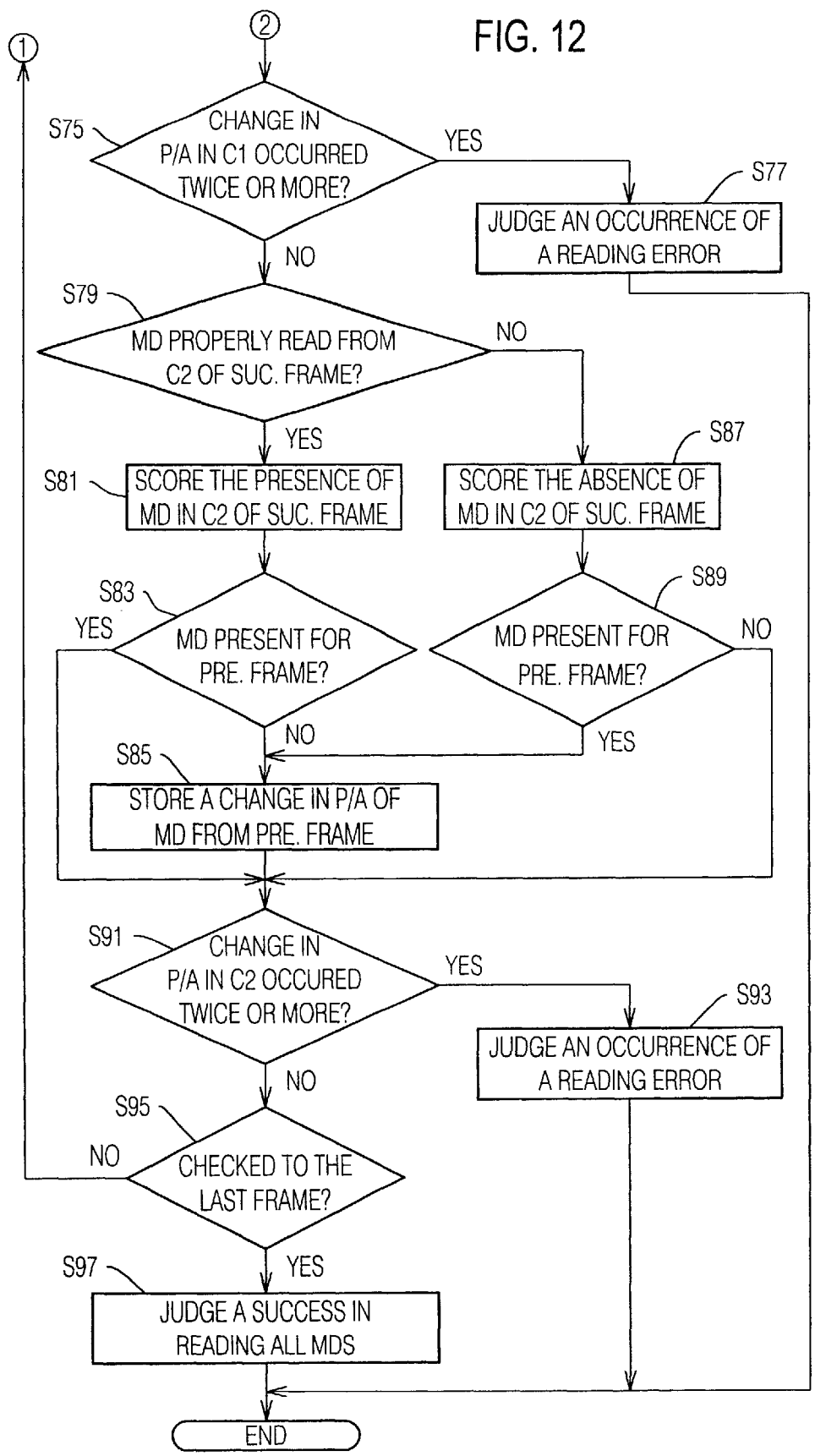
FIG. 12 is a flow chart illustrating Step S15 of FIG. 9 in greater detail.

If the analysis results in a "YES" in Step S67, or a "NO" in Step S73, or after the operation in Step S69, whether or not the change in the presence/absence of the magnetic data 55 in the track C1 from the previous frame 51 has occurred twice or more is determined (Step S67) as shown in FIG. 12. If this change has occurred twice or more, it is judged that a reading error has occurred for the frame 51 having no magnetic data 55 (Step S77), and this subroutine ends.

Unless the change has occurred twice or more in Step S75, whether the magnetic data 55 has been properly read from the track C2 of the succeeding frame 51 is determined (Step S79). If the magnetic data has been properly read, the presence of the magnetic data 55 in the track C2 of the succeeding frame 51 is stored in RAM 18 (Step S81) and whether the magnetic data 55 is present for the previous frame 51 is determined (Step S83). If the magnetic data 55 is absent in the previous frame 51, the change in the presence/absence of the magnetic data 55 from the previous frame 51 is stored in RAM 18 (Step S85).

On the other hand, if the magnetic data 55 is determined not to have been properly read in Step S79, the absence of the magnetic data 55 in the track C2 of the succeeding frame 51 is stored in RAM 18 (Step S87), and whether or not the magnetic data 55 is present for the previous frame 51 is determined (Step S89). Step S85 follows if the magnetic data 55 is present for the previous frame 51.

If the analysis yields a "YES" in Step S83, a "NO" in Step S89, or after the operation in Step S85, whether the change in the presence/absence of the magnetic data 55 in the track C2 from the previous frame 51 has occurred twice or more is determined (Step S91). If this change has occurred twice or more, it is judged that a reading error has occurred for the frame 51 having no magnetic data 55 (Step S93), and this flow ends.

Unless the change has occurred twice or more in Step S91, whether or not the check has been made up to the last frame 51 (Step S95) is determined. If not, this flow returns to Step S63. If the check has been made up to the last frame 51, all the magnetic data 55 are judged to have been successfully read upon the assumption that no magnetic data 55 was recorded for the frame 51 having no magnetic data 55 (Step S97), and this flow ends.

Figure 11:
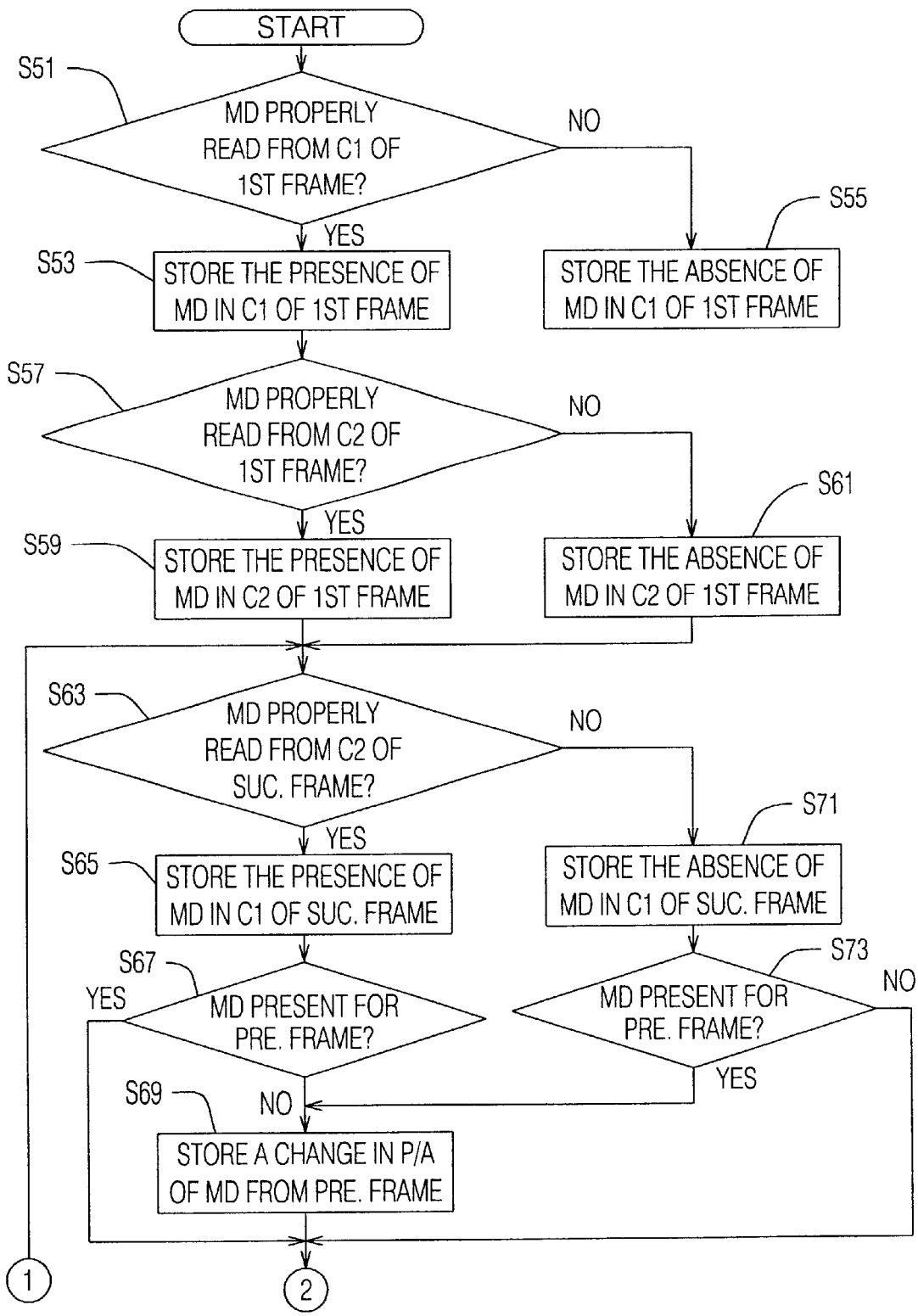
FIG. 11 is a flow chart illustrating Step S7 of FIG. 9 in greater detail.

Accordingly, the criteria for judging by the operations shown in FIGS. 11 and 12 as to whether or not the magnetic data 55 have been read are shown in FIGS. 13A to 13F. The read states of the magnetic data 55 shown in FIGS. 13A to 13D are not judged as reading errors. If the magnetic data 55 was read from none of the frames of the film 34 as shown in FIG. 13A, it is judged that no magnetic data 55 is recorded on the film 34, and no reading error occurred. If the magnetic data 55 were read from all of the frames of the film 34 as shown in FIG. 13B, it is judged that exposure was made from the first frame to the last frame of the film 34, and no reading error occurred. If the magnetic data 55 were read from the first frame to an intermediate frame of the film 34 as shown in FIG. 13C, it is judged that exposure was made up to the intermediate frame of the film 34, and no reading error occurred. If the magnetic data 55 were read from an intermediate frame to the last frame of the film 34 as shown in FIG. 13D, it is judged that exposure was made up to the film 34 from the intermediate frame, and no reading error occurred. In this way, no reading error is judged to have occurred if the read state of the magnetic data 55 changes once or not at all between the first and last frames of the film 34.

On the other hand, a reading error is judged to have occurred if the read state of the magnetic data 55 changes twice or more between the first and last frames of the film 34 as shown in FIGS. 13E and 13F. This enables judgment on the occurrence of a reading error where no magnetic data 55 is recorded on the film 34, where exposure was made to the film 34 from the intermediate frame, and where exposure was made to the film 34 up to the intermediate frame.

In the film feeding apparatus 10, if there is a frame 51 whose magnetic data 55 failed to be read while the film was unwound during the scanning, the magnetic data 55 are also automatically read during the rewinding of the film after scanning. In this way, the probability of reading the magnetic data 55 is improved by reading the magnetic data 55 also during the rewinding of the film after changing the reading state by reversing the feeding direction of the film 34. The need for rereading the magnetic data 55 by performing the scanning again becomes remarkably lower. Therefore, operability is dramatically improved.

During the unwinding of the film 34, the magnetic data 55 are read by intermittently feeding the film 34 frame by frame.

During the rewinding of the film 34, the magnetic data 55 are continuously read without stopping the film feeding motor 48.

Since the magnetic data 55 can be read with the reading conditions, the reading rate of the magnetic data 55 is improved.

Further, since the feeding speed of the film 34 is changed when the magnetic data 55 are reread, the magnetic data 55 recorded at a considerably high or low recording density can also be properly read. As a result, the reliability of the apparatus is improved by eliminating the need for reading the magnetic data 55 again and again. In addition, the photographed images are also more likely to be finished into prints consistent with the photographer's intention, thereby preventing difficulty.

Although the magnetic data 55 are read also during the rewinding of the film 34, the invention is not limited to the case where a frame 51 was not read during the first unwinding of the film. Specifically, if there is a frame 51 whose magnetic data 55 was not read during the first unwinding of the film, the film 34 is rewound without reading the magnetic data 55, and the magnetic data 55 of the film 34 may be read during the second unwinding of the film after the feeding speed of the film 34 is changed.

The quantitative results of the reading rate of magnetic data 55 by an experiment is described below. This experiment was conducted by a method comprising the steps of (A) reading the magnetic data 55 during the unwinding of the film for the scanning, (B) reading the magnetic data 55 during the rewinding of the film, (C) unwinding the film after changing the feeding speed to reread the magnetic data 55, and (D) rereading the magnetic data 55 during the rewinding of the film. The reading rates of the magnetic data 55 were measured after the completion of the respective operation steps.

The reading rate ① of the magnetic data after the completion of the operation step (A), the reading rate ② thereof after the completion of the operation step (B) and the reading state ③ thereof after the completion of the operation step (D) are shown in TABLE-1.

As conditions of the experiment, the rotating speeds of the film feeding motor 48 were 3250 pps during the unwinding of the film (A), 3500 pps during the rewinding of the film (B) and (D) and 2650 pps during the unwinding of the film (C), 5 rolls of film were prepared, and one measurement was carried out for each film. The same medium was used for all the measurements.

TABLE 1

| Film No. | Measured Reading Rate (%) | | |
|---|---|---|---|
| | ① | ② | ③ |
| 1 | 64.2 | 97.5 | 97.5 |
| 2 | 80.0 | 87.5 | 88.3 |
| 3 | 35.0 | 80.8 | 81.7 |
| 4 | 62.5 | 93.3 | 95.0 |
| 5 | 54.2 | 78.3 | 87.5 |

As can be seen from TABLE-1, as the operations progress from (A) to (D), the reading rate of the magnetic data is improved.

Next, the results for the reading rate of the magnetic data 55 by another experiment is described. This experiment was conducted by a method comprising the steps of (A) rewinding the film after reading the magnetic data 55 during the unwinding of the film for the scanning, and (B) unwinding the film after changing the feeding speed to thereby reread the magnetic data 55. The reading rate ① of the magnetic data after the of the operation step (A) and the reading rate ② er the completion of the operation step (B) were measured. The measured results are shown in TABLE-2.

In this experiment, the rotating speeds of the film feeding motor 48 were 3250 pps during the unwinding of the film (A), 2650 pps during the unwinding of the film (B) and 3500 pps during the rewinding of the film. 5 rolls of film were prepared, and one measurement was carried out for each film. The same medium was used for all the measurements.

TABLE 2

| Film No. | Measured Reading Rate (%) | |
|---|---|---|
| | ① | ② |
| 1 | 97.5 | 99.2 |
| 2 | 96.7 | 98.3 |
| 3 | 97.5 | 99.2 |
| 4 | 97.5 | 98.3 |
| 5 | 90.8 | 95.0 |

As can be seen from TABLE-2, the reading rate is improved by rereading the magnetic data 55 after changing the feeding speed of the film.

Figure 9:
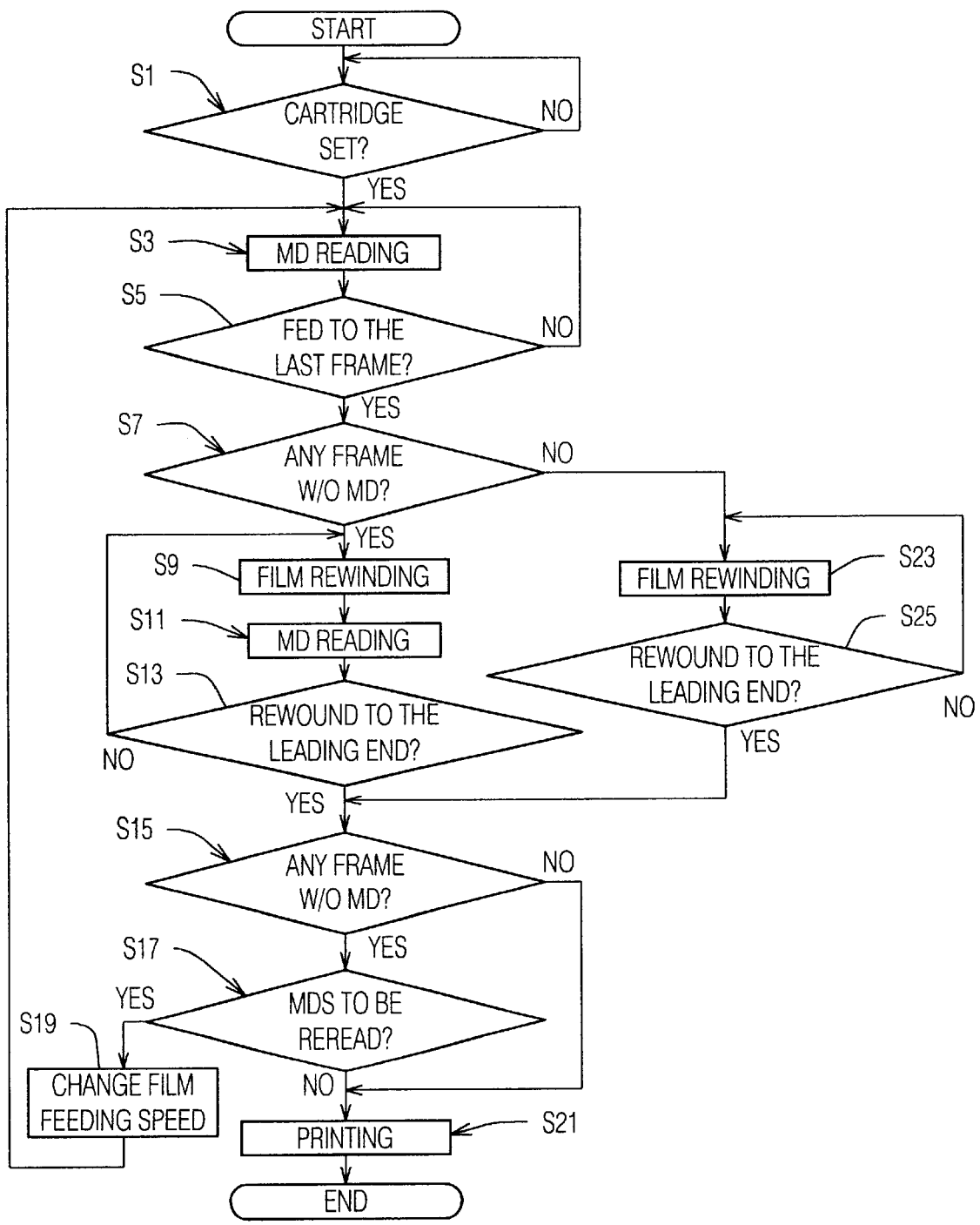
FIG. 9 is a flow chart showing the operation of the apparatus according to one embodiment of the present invention.

When the film feeding apparatus 10 is applied to an apparatus for scanning the image information of the film 34 without printng it, the printing controller 114 and the printing assembly 116 shown in FIG. 2 and Step S21 shown in FIG. 9 may be omitted.

According to the present invention, the operability and reliability of the apparatus can be improved since the reading rate of the magnetic data is improved.

What is claimed is:

1. A film feeding apparatus for feeding photographic film having magnetic data recorded on the film comprising:
   a storage means for storing magnetic data for each frame,
   a reading means for reading the magnetic data of each frame while the film is being fed and then storing the read magnetic data in said storage means,
   a first judgment means for judging, based on the data stored in said storage means, whether there is a frame whose magnetic data was not read, and
   wherein said reading means includes further means for changing a condition if there is a frame whose magnetic data has not been read yet, reading the magnetic data again and storing the read magnetic data in said storage means, wherein said further means comprises means for reading the magnetic data while the film is being rewound.

2. A film feeding apparatus as claimed in claim 1, wherein said reading means reads the magnetic data by intermittently feeding the film frame by frame, and said further means reads the magnetic data by continuously feeding the film.

3. A film feeding apparatus as claimed in claim 2, further comprising a rereading means for changing the reading condition again if there is a frame whose magnetic data has not been read yet after the rewinding of the film, rereading the magnetic data, and storing the read magnetic data in said storage means.

4. A film feeding apparatus as claimed in claim 1, further comprising a rereading means for changing the reading condition again if there is a frame whose magnetic data has not been read yet after the rewinding of the film, rereading the magnetic data, and storing the read magnetic data in said storage means.

5. A film feeding apparatus according to claim 4, wherein said rereading means comprises means for notifying an operator that there is a frame whose magnetic data has not been read yet even after the rewinding of the film, and means for changing a feeding speed of the film upon receipt of a command from an operator to reread the magnetic data again and rereading the magnetic data.

6. A film feeding apparatus according to claim 5, wherein said storage means stores flags indicative of the magnetic data of each frame and the presence or absence of the magnetic data for each frame, and said first judgment means comprises a second judgment means for judging, based on the flags stored in said storage means, whether there is any frame whose magnetic data has not been read yet.

7. A film feeding apparatus according to claim 6, wherein said second judgment means refers to the flags and judges that a reading error occurred in reading the magnetic data for the frame, for which no magnetic data has been read, if the presence/absence of the magnetic data between adjacent or successive frames has changed twice or more.

8. A film feeding apparatus according to claim 1, wherein said storage means stores flags indicative of the magnetic data of each frame and the presence or absence of the magnetic data for each frame, and said first judgment means comprises a second judgment means for judging, based on the flags stored in said storage means, whether there is any frame whose magnetic data has not been read yet.

9. A film feeding apparatus for feeding photographic film having magnetic data recorded on the film comprising:

a storage means for storing magnetic data for each frame, a first reading means for reading the magnetic data of each frame while the film is being fed and then storing the read magnetic data in said storage means, a first judgment means for judging, based on the data stored in said storage means, whether there is a frame whose magnetic data was not read, and wherein said reading means includes further means for changing a condition if there is a frame whose magnetic data has not been read yet, reading the magnetic data again and storing the read magnetic data in said storage means, wherein said further means changes a feeding speed of the film after the rewinding of the film and rereads the magnetic data.

10. A film feeding apparatus according to claim 9, wherein said storage means stores flags indicative of the magnetic data of each frame and the presence or absence of the magnetic data for each frame, and said first judgment means comprises a second judgment means for judging, based on the flags stored in said storage means, whether there is any frame whose magnetic data has not been read yet.

11. A film feeding method for feeding a film so that magnetic data recorded on the film can be read, comprising:

reading magnetic data frame by frame while the film is being fed and storing an information on the magnetic data for each frame in a storage means, judging, based on the information stored in said storage means, whether there is any frame whose magnetic data has not been read yet, reading the magnetic data during the rewinding of the film if there is a frame whose magnetic data has not been read yet and storing the information on the magnetic data in said storage means, judging after the film is rewound based on the information stored in said storage means whether there is any frame whose magnetic data has not been read yet, notifying an operator that there is some frame whose magnetic data has not been read yet, and changing a feeding speed of the film and rereading the magnetic data again upon receipt of a command from an operator to reread the magnetic data again.

\* \* \* \* \*